US010524076B2

(12) United States Patent
Eronen et al.

(10) Patent No.: US 10,524,076 B2
(45) Date of Patent: Dec. 31, 2019

(54) CONTROL OF AUDIO RENDERING

(71) Applicant: Nokia Technologies Oy, Espoo (FI)

(72) Inventors: Antti Eronen, Tampere (FI); Arto Lehtiniemi, Lampäälä (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/091,505

(22) PCT Filed: Apr. 12, 2017

(86) PCT No.: PCT/FI2017/050264
§ 371 (c)(1),
(2) Date: Oct. 4, 2018

(87) PCT Pub. No.: WO2017/178705
PCT Pub. Date: Oct. 19, 2017

(65) Prior Publication Data
US 2019/0124463 A1    Apr. 25, 2019

(30) Foreign Application Priority Data
Apr. 13, 2016    (EP) .................... 16165152

(51) Int. Cl.
*H04S 7/00* (2006.01)
*G06F 3/16* (2006.01)
*H04S 3/00* (2006.01)

(52) U.S. Cl.
CPC .............. *H04S 7/303* (2013.01); *G06F 3/165* (2013.01); *H04S 3/008* (2013.01); *H04S 2400/01* (2013.01); *H04S 2400/13* (2013.01)

(58) Field of Classification Search
CPC ...... H04S 7/302; H04S 7/303; H04S 2400/01; H04S 3/008; H04S 2400/13; H04S 7/40; G06F 3/165
USPC ........................................... 381/303
See application file for complete search history.

(56) References Cited

U.S. PATENT DOCUMENTS

| | | | |
|---|---|---|---|
| 2003/0174845 A1* | 9/2003 | Hagiwara | H04S 3/00 381/17 |
| 2008/0253577 A1* | 10/2008 | Eppolito | H04S 7/40 381/17 |

FOREIGN PATENT DOCUMENTS

| | | |
|---|---|---|
| EP | 3174005 A1 | 5/2017 |
| GB | 2540224 A | 1/2017 |
| GB | 2543276 A | 4/2017 |

OTHER PUBLICATIONS

Extended European Search Report received for corresponding European Patent Application No. 16165152.6, dated Oct. 6, 2016, 8 pages.
International Search Report and Written Opinion received for corresponding Patent Cooperation Treaty Application No. PCT/FI2017/050264, dated Jun. 26, 2017, 13 pages.

* cited by examiner

*Primary Examiner* — Paul Kim
(74) *Attorney, Agent, or Firm* — Alston & Bird LLP

(57) ABSTRACT

A method comprising: processing audio signals to rotate a sound scene so that a user selected sound object is automatically at a first position within the rotated sound scene; enabling user editing of audio properties of the selected sound object to create a modified sound object; and causing rendering of the sound scene using the modified sound object.

20 Claims, 5 Drawing Sheets

$\theta_2 - \theta_1 = \alpha_2 - \alpha_1 = \Delta$

CONTROL OF AUDIO RENDERING

RELATED APPLICATION

This application was originally filed as Patent Cooperation Treaty Application No. /FI2017/050264 filed Apr. 12, 2017 which claims priority benefit to EP Patent Application No. 16165152.6, filed Apr. 13, 2016.

TECHNOLOGICAL FIELD

Embodiments of the present invention relate to control of audio rendering. In particular, they relate to control of audio rendering of a sound scene comprising multiple sound objects.

BACKGROUND

A sound scene in this document is used to refer to the arrangement of sound sources in a three-dimensional space. When a sound source changes position, the sound scene changes. When the sound source changes its audio properties such as its audio output, then the sound scene changes.

A sound scene may be defined in relation to recording sounds (a recorded sound scene) and in relation to rendering sounds (a rendered sound scene).

Some current technology focuses on accurately reproducing a recorded sound scene as a rendered sound scene at a distance in time and space from the recorded sound scene. The recorded sound scene is encoded for storage and/or transmission.

A sound object within a sound scene may be a source sound object that represents a sound source within the sound scene or may be a recorded sound object which represents sounds recorded at a particular microphone. In this document, reference to a sound object refers to both a recorded sound object and a source sound object. However, in some examples, the sound object(s) may be only source sound objects and in other examples the sound object(s) may be only recorded sound objects.

By using audio processing it may be possible, in some circumstances, to convert a recorded sound object into a source sound object and/or to convert a source sound object into a recorded sound object.

It may be desirable in some circumstances to record a sound scene using multiple microphones. Some microphones, such as Lavalier microphones, or other portable microphones, may be attached to or may follow a sound source in the sound scene. Other microphones may be static in the sound scene.

The combination of outputs from the various microphones defines a recorded sound scene. However, it may not always be desirable to render the sound scene exactly as it has been recorded. It is therefore desirable, in some circumstances, to enable a user, for example a sound engineer, to control audio rendering by adapting the recorded sound scene to produce an alternative rendered sound scene.

BRIEF SUMMARY

According to various, but not necessarily all, embodiments of the invention there is provided a method comprising: processing audio signals to rotate a sound scene so that a user selected sound object is automatically at a first position within the rotated sound scene; enabling user editing of at least one audio property of the selected sound object to create a modified sound object; and causing rendering of the sound scene using the modified sound object.

According to various, but not necessarily all, embodiments of the invention there is provided an apparatus comprising means for performing: processing audio signals to rotate a sound scene so that a user selected sound object is automatically at a first position within the rotated sound scene; enabling user editing of audio properties of the selected sound object to create a modified sound object; and causing rendering of the sound scene using the modified sound object.

According to various, but not necessarily all, embodiments of the invention there is provided a computer program, that when run by a processor, enables the performance of: processing audio signals to rotate a sound scene so that a user selected sound object is automatically at a first position within the rotated sound scene; enabling user editing of audio properties of the selected sound object to create a modified sound object; and causing rendering of the sound scene using the modified sound object.

According to various, but not necessarily all, embodiments of the invention there is provided an apparatus comprising: at least one processor; and at least one memory including computer program code the at least one memory and the computer program code configured to, with the at least one processor, cause the apparatus at least to perform: processing audio signals to rotate a sound scene so that a user selected sound object is automatically at a first position within the rotated sound scene; enabling user editing of audio properties of the selected sound object to create a modified sound object; and causing rendering of the sound scene using the modified sound object.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIG. 1 illustrates an example of a system and also an example of a method for recording and encoding a sound scene;

FIG. 2 schematically illustrates relative positions of a portable microphone (PM) and static microphone (SM) relative to an arbitrary reference point (REF);

DETAILED DESCRIPTION

Figure 1:
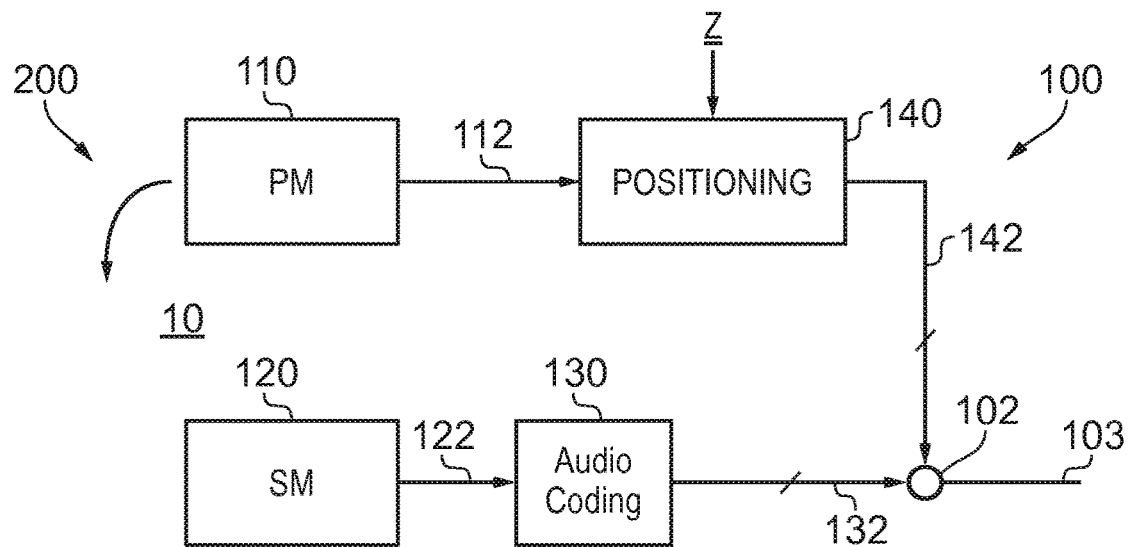

FIG. 1 illustrates an example of a system 100 and also an example of a method 200. The system 100 and method 200 record a sound scene 10 and process the recorded sound scene to enable an accurate rendering of the recorded sound scene as a rendered sound scene for a listener at a particular position (the origin) within the recorded sound scene 10.

In this example, the origin of the sound scene is at a microphone 120. In this example, the microphone 120 is static. It may record one or more channels, for example it may be a microphone array.

In this example, only a single static microphone 120 is illustrated. However, in other examples multiple static microphones 120 may be used independently. In such circumstances the origin may be at any one of these static microphones 120 and it may be desirable to switch, in some circumstances, the origin between static microphones 120 or to position the origin at an arbitrary position within the sound scene.

The system 100 also comprises one or more portable microphones 110. The portable microphone 110 may, for example, move with a sound source within the recorded sound scene 10. The portable microphone may, for example, be an 'up-close' microphone that remains close to a sound source. This may be achieved, for example, using a boom microphone or, for example, attaching the microphone to the sound source, for example, by using a Lavalier microphone. The portable microphone 110 may record one or more recording channels.

Figure 2:
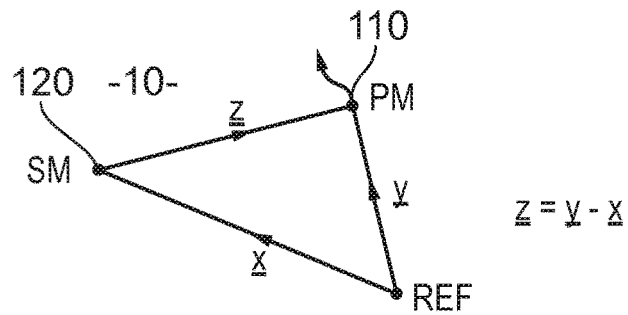

FIG. 2 schematically illustrates the relative positions of the portable microphone (PM) 110 and the static microphone (SM) 120 relative to an arbitrary reference point (REF). The position of the static microphone 120 relative to the reference point REF is represented by the vector x. The position of the portable microphone PM relative to the reference point REF is represented by the vector y. The relative position of the portable microphone PM 110 from the static microphone SM 120 is represented by the vector z. It will be understood that z=y−x. The vector z gives the relative position of the portable microphone 110 relative to the static microphone 120 which, in this example, is the origin of the sound scene 10. The vector z therefore positions the portable microphone 110 relative to a notional listener of the recorded sound scene 10. As the origin at the static microphone SM is static, the vector x is constant. Therefore, if one has knowledge of x and tracks variations in y, it is possible to also track variations in z, the relative position of the portable microphone 110 relative to the origin of the sound scene 10.

There are many different technologies that may be used to position an object including passive systems where the positioned object is passive and does not produce a signal and active systems where the positioned object produces a signal. An example of a passive system, used in the Kinect™ device, is when an object is painted with a non-homogenous pattern of symbols using infrared light and the reflected light is measured using multiple cameras and then processed, using the parallax effect, to determine a position of the object. An example of an active system is when an object has a transmitter that transmits a radio signal to multiple receivers to enable the object to be positioned by, for example, trilateration. An example of an active system is when an object has a receiver or receivers that receive a radio signal from multiple transmitters to enable the object to be positioned by, for example, trilateration.

When the sound scene 10 as recorded is rendered to a user (listener) by the system 100 in FIG. 1, it is rendered to the listener as if the listener is positioned at the origin of the recorded sound scene 10. It is therefore important that, as the portable microphone 110 moves in the recorded sound scene 10, its position z relative to the origin of the recorded sound scene 10 is tracked and is correctly represented in the rendered sound scene. The system 100 is configured to achieve this.

In the example of FIG. 1, the audio signals 122 output from the static microphone 120 are coded by audio coder 130 into a multichannel audio signal 132. If multiple static microphones were present, the output of each would be separately coded by an audio coder into a multichannel audio signal.

The audio coder 130 may be a spatial audio coder such that the multichannels 132 represent the sound scene 10 as recorded by the static microphone 120 and can be rendered giving a spatial audio effect. For example, the audio coder 130 may be configured to produce multichannel audio signals 132 according to a defined standard such as, for example, binaural coding, 5.1 surround sound coding, 7.1 surround sound coding etc. If multiple static microphones were present, the multichannel signal of each static microphone would be produced according to the same defined standard such as, for example, binaural coding, 5.1 surround sound coding, and 7.1 surround sound coding and in relation to the same common rendered sound scene.

The multichannel audio signals 132 from one or more the static microphones 120 are mixed by mixer 102 with multichannel audio signals 142 from the one or more portable microphones 110 to produce a multi-microphone multichannel audio signal 103 that represents the recorded sound scene 10 relative to the origin and which can be rendered by an audio decoder corresponding to the audio coder 130 to reproduce a rendered sound scene to a listener that corresponds to the recorded sound scene when the listener is at the origin.

The multichannel audio signal 142 from the, or each, portable microphone 110 is processed before mixing to take account of any movement of the portable microphone 110 relative to the origin at the static microphone 120.

The audio signals 112 output from the portable microphone 110 are processed by the positioning block 140 to adjust for movement of the portable microphone 110 relative to the origin at static microphone 120. The positioning block 140 takes as an input the vector z or some parameter or parameters dependent upon the vector z. The vector z represents the relative position of the portable microphone 110 relative to the origin at the static microphone 120 in this example.

The positioning block 140 may be configured to adjust for any time misalignment between the audio signals 112 recorded by the portable microphone 110 and the audio signals 122 recorded by the static microphone 120 so that they share a common time reference frame. This may be achieved, for example, by correlating naturally occurring or artificially introduced (non-audible) audio signals that are present within the audio signals 112 from the portable microphone 110 with those within the audio signals 122 from the static microphone 120. Any timing offset identified by the correlation may be used to delay/advance the audio signals 112 from the portable microphone 110 before processing by the positioning block 140.

The positioning block 140 processes the audio signals 112 from the portable microphone 110, taking into account the relative orientation (Arg(z)) of that portable microphone 110 relative to the origin at the static microphone 120.

The audio coding of the static microphone audio signals 122 to produce the multichannel audio signal 132 assumes a particular orientation of the rendered sound scene relative to an orientation of the recorded sound scene and the audio signals 122 are encoded to the multichannel audio signals 132 accordingly.

The relative orientation Arg (z) of the portable microphone 110 in the recorded sound scene 10 is determined and the audio signals 112 representing the sound object are coded to the multichannels defined by the audio coding 130 such that the sound object is correctly oriented within the rendered sound scene at a relative orientation Arg (z) from the listener. For example, the audio signals 112 may first be mixed or encoded into the multichannel signals 142 and then a transformation T may be used to rotate the multichannel audio signals 142, representing the moving sound object, within the space defined by those multiple channels by Arg (z).

Figure 4A:
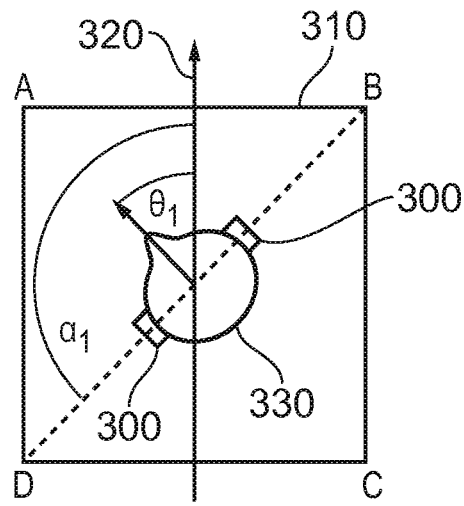
FIGS. 4A and 4B illustrate a change in relative orientation between a listener and the rendered sound scene so that the rendered sound scene remains fixed in space.
Figure 4B:
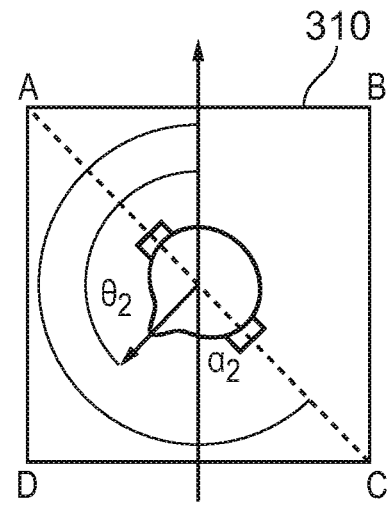

Referring to FIGS. 4A and 4B, in some situations, for example when the sound scene is rendered to a listener through a head-mounted audio output device 300, for example headphones using binaural audio coding, it may be desirable for the rendered sound scene 310 to remain fixed in space 320 when the listener turns their head 330 in space. This means that the rendered sound scene 310 needs to be rotated relative to the audio output device 300 by the same amount in the opposite sense to the head rotation.

In FIGS. 4A and 4B, the relative orientation between the listener and the rendered sound scene 310 is represented by an angle θ. The sound scene is rendered by the audio output device 300 which physically rotates in the space 320. The relative orientation between the audio output device 300 and the rendered sound scene 310 is represented by an angle α. As the audio output device 300 does not move relative to the user's head 330 there is a fixed offset between θ and α of 90° in this example. When the user turns their head θ changes. If the sound scene is to be rendered as fixed in space then α must change by the same amount in the same sense.

Moving from FIG. 4A to 4B, the user turns their head clockwise increasing θ by magnitude Δ and increasing α by magnitude Δ. The rendered sound scene is rotated relative to the audio device in an anticlockwise direction by magnitude Δ so that the rendered sound scene 310 remains fixed in space.

The orientation of the rendered sound scene 310 tracks with the rotation of the listener's head so that the orientation of the rendered sound scene 310 remains fixed in space 320 and does not move with the listener's head 330.

Figure 3:
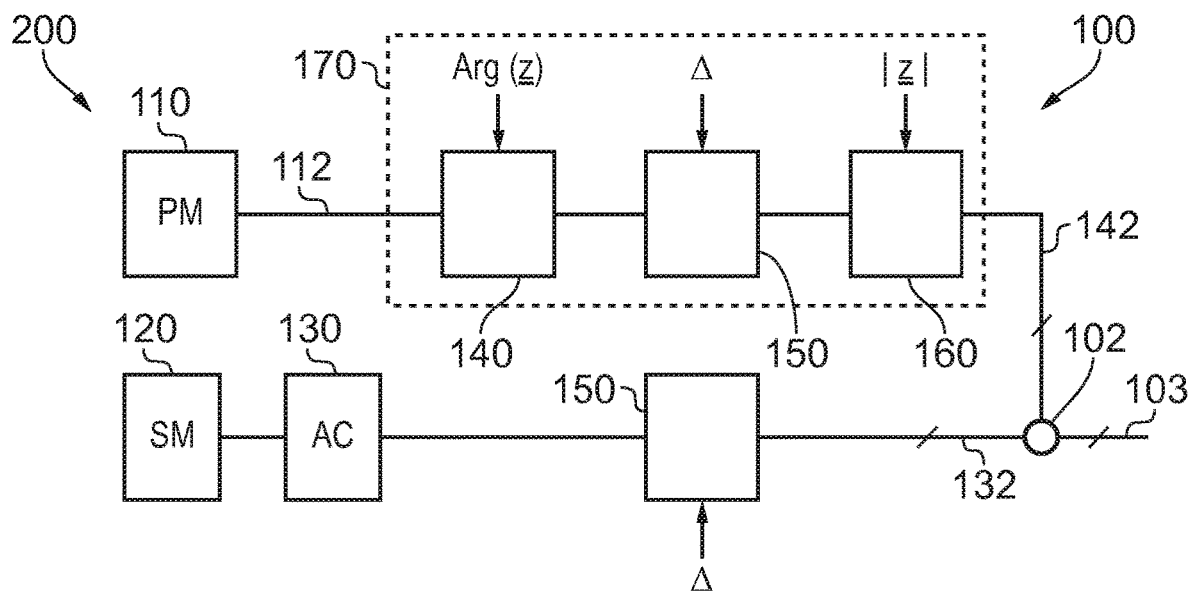
FIG. 3 illustrates a system as illustrated in FIG. 1, modified to rotate the rendered sound scene relative to the recorded sound scene.

FIG. 3 illustrates a system 100 as illustrated in FIG. 1, modified to rotate the rendered sound scene 310 relative to the recorded sound scene 10. This will rotate the rendered sound scene 310 relative to the audio output device 300 which has a fixed relationship with the recorded sound scene 10.

An orientation block 150 is used to rotate the multichannel audio signals 142 by Δ, determined by rotation of the user's head.

Similarly, an orientation block 150 is used to rotate the multichannel audio signals 132 by Δ, determined by rotation of the user's head.

The functionality of the orientation block 150 is very similar to the functionality of the orientation function of the positioning block 140.

The audio coding of the static microphone signals 122 to produce the multichannel audio signals 132 assumes a particular orientation of the rendered sound scene relative to the recorded sound scene. This orientation is offset by Δ. Accordingly, the audio signals 122 are encoded to the multichannel audio signals 132 and the audio signals 112 are encoded to the multichannel audio signals 142 accordingly. The transformation T may be used to rotate the multichannel audio signals 132 within the space defined by those multiple channels by Δ. An additional transformation T may be used to rotate the multichannel audio signals 142 within the space defined by those multiple channels by Δ.

In the example of FIG. 3, the portable microphone signals 112 are additionally processed to control the perception of the distance D of the sound object from the listener in the rendered sound scene, for example, to match the distance |z| of the sound object from the origin in the recorded sound scene 10. This can be useful when binaural coding is used so that the sound object is, for example, externalized from the user and appears to be at a distance rather than within the user's head, between the user's ears. The distance block 160 processes the multichannel audio signal 142 to modify the perception of distance.

Figure 5:
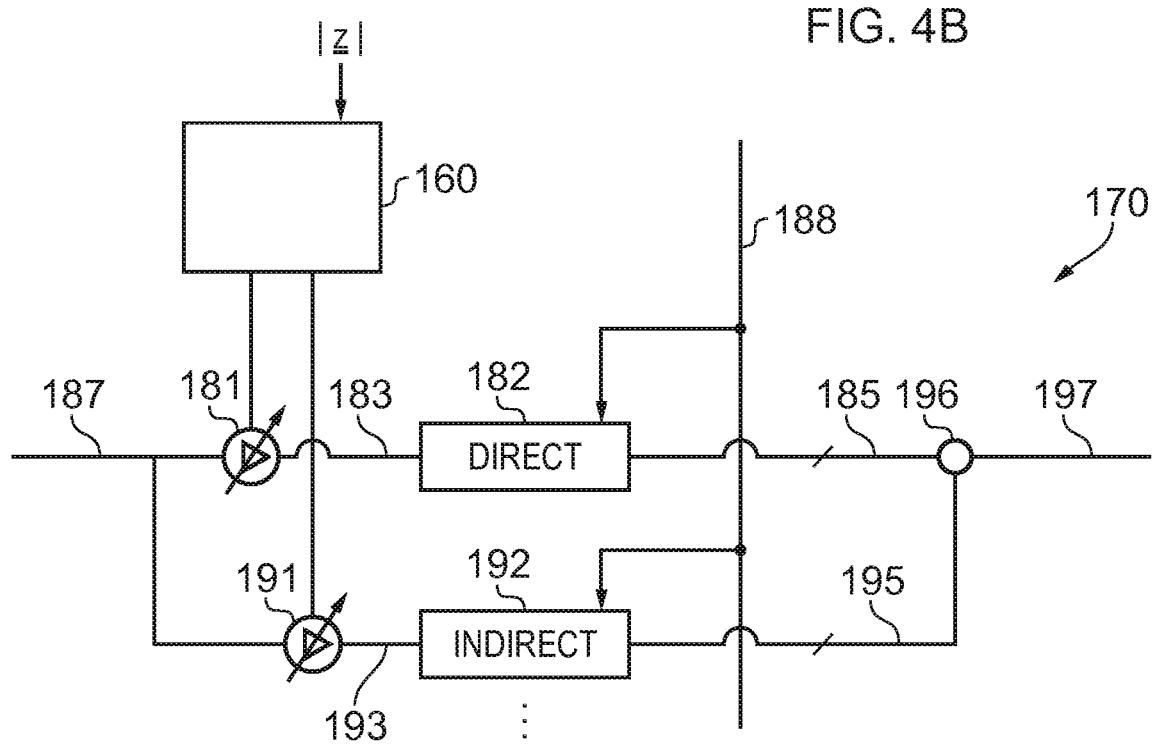
FIG. 5 illustrates a module which may be used, for example, to perform the functions of the positioning block, orientation block and distance block of the system.

FIG. 5 illustrates a module 170 which may be used, for example, to perform the functions of the positioning block 140, orientation block 150 and distance block 160 in FIG. 3. The module 170 may be implemented using circuitry and/or programmed processors.

The Figure illustrates the processing of a single channel of the multichannel audio signal 142 before it is mixed with the multichannel audio signal 132 to form the multi-microphone multichannel audio signal 103. A single input channel of the multichannel signal 142 is input as signal 187.

The input signal 187 passes in parallel through a "direct" path and one or more "indirect" paths before the outputs from the paths are mixed together, as multichannel signals, by mixer 196 to produce the output multichannel signal 197. The output multichannel signal 197, for each of the input channels, are mixed to form the multichannel audio signal 142 that is mixed with the multichannel audio signal 132.

The direct path represents audio signals that appear, to a listener, to have been received directly from an audio source and an indirect path represents audio signals that appear to a listener to have been received from an audio source via an indirect path such as a multipath or a reflected path or a refracted path.

The distance block 160 by modifying the relative gain between the direct path and the indirect paths, changes the perception of the distance D of the sound object from the listener in the rendered sound scene 310.

Each of the parallel paths comprises a variable gain device 181, 191 which is controlled by the distance module 160.

The perception of distance can be controlled by controlling relative gain between the direct path and the indirect (decorrelated) paths. Increasing the indirect path gain relative to the direct path gain increases the perception of distance.

In the direct path, the input signal 187 is amplified by variable gain device 181, under the control of the positioning block 160, to produce a gain-adjusted signal 183. The gain-adjusted signal 183 is processed by a direct processing module 182 to produce a direct multichannel audio signal 185.

In the indirect path, the input signal 187 is amplified by variable gain device 191, under the control of the positioning block 160, to produce a gain-adjusted signal 193. The gain-adjusted signal 193 is processed by an indirect processing module 192 to produce an indirect multichannel audio signal 195.

The direct multichannel audio signal 185 and the one or more indirect multichannel audio signals 195 are mixed in the mixer 196 to produce the output multichannel audio signal 197.

The direct processing block 182 and the indirect processing block 192 both receive direction of arrival signals 188. The direction of arrival signal 187 gives the orientation Arg(z) of the portable microphone 110 (moving sound object) in the recorded sound scene 10 and the orientation Δ of the rendered sound scene 310 relative to the audio output device 300.

The position of the moving sound object changes as the portable microphone 110 moves in the recorded sound scene 10 and the orientation of the rendered sound scene 310 changes as the head-mounted audio output device, rendering the sound scene rotates.

Figures 6A, 6B:
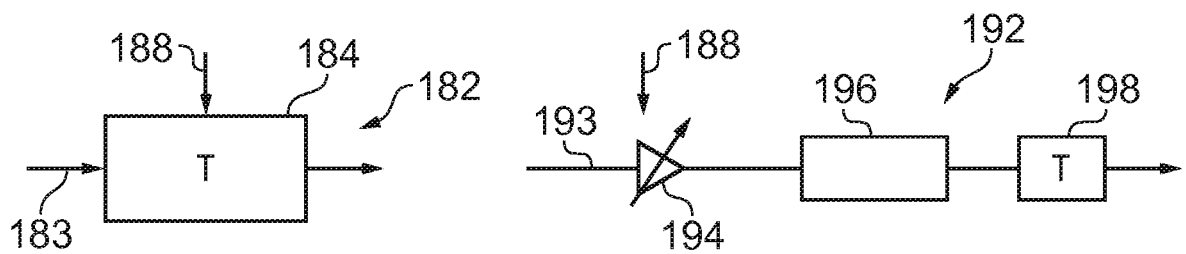
FIGS. 6A and 6B illustrate examples of a direct module and an indirect module for use in the module of FIG. 5.

The direct module 182 may, for example, include a system 184 similar to that illustrated in FIG. 6A that rotates the single channel audio signal, gain-adjusted input signal 183, in the appropriate multichannel space producing the direct multichannel audio signal 185.

The system 184 uses a transfer function to performs a transformation T that rotates multichannel signals within the space defined for those multiple channels by Arg(z) and by Δ, defined by the direction of arrival signal 188. For example, a head related transfer function (HRTF) interpolator may be used for binaural audio. As another example, Vector Base Amplitude Panning (VBAP) may be used for loudspeaker format (e.g. 5.1) audio.

The indirect module 192 may, for example, be implemented as illustrated in FIG. 6B. In this example, the direction of arrival signal 188 controls the gain of the single channel audio signal, the gain-adjusted input signal 193, using a variable gain device 194. The amplified signal is then processed using a static decorrelator 196 and then a system 198 that applies a static transformation T to produce the output multichannel audio signals 193. The static decorrelator in this example use a pre-delay of at least 2 ms. The transformation T rotates multichannel signals within the space defined for those multiple channels in a manner similar to the system 184 but by a fixed amount. For example, a static head related transfer function (HRTF) interpolator may be used for binaural audio.

It will therefore be appreciated that the module 170 can be used to process the portable microphone signals 112 and perform the functions of:

(i) changing the relative position (orientation Arg(z) and/or distance |z|) of a sound object, represented by a portable microphone audio signal 112, from a listener in the rendered sound scene and (ii) changing the orientation of the rendered sound scene (including the sound object positioned according to (i)) relative to a rotating rendering audio output device 300.

It should also be appreciated that the module 170 may also be used for performing the function of the orientation module 150 only, when processing the audio signals 122 provided by the static microphone 120. However, the direction of arrival signal will include only Δ and will not include Arg(z). In some but not necessarily all examples, gain of the variable gain devices 191 modifying the gain to the indirect paths may be put to zero and the gain of the variable gain device 181 for the direct path may be fixed. In this instance, the module 170 reduces to the system 184 illustrated in FIG. 6A that rotates the recorded sound scene to produce the rendered sound scene according to a direction of arrival signal that includes only Δ and does not include Arg(z).

Figure 7:
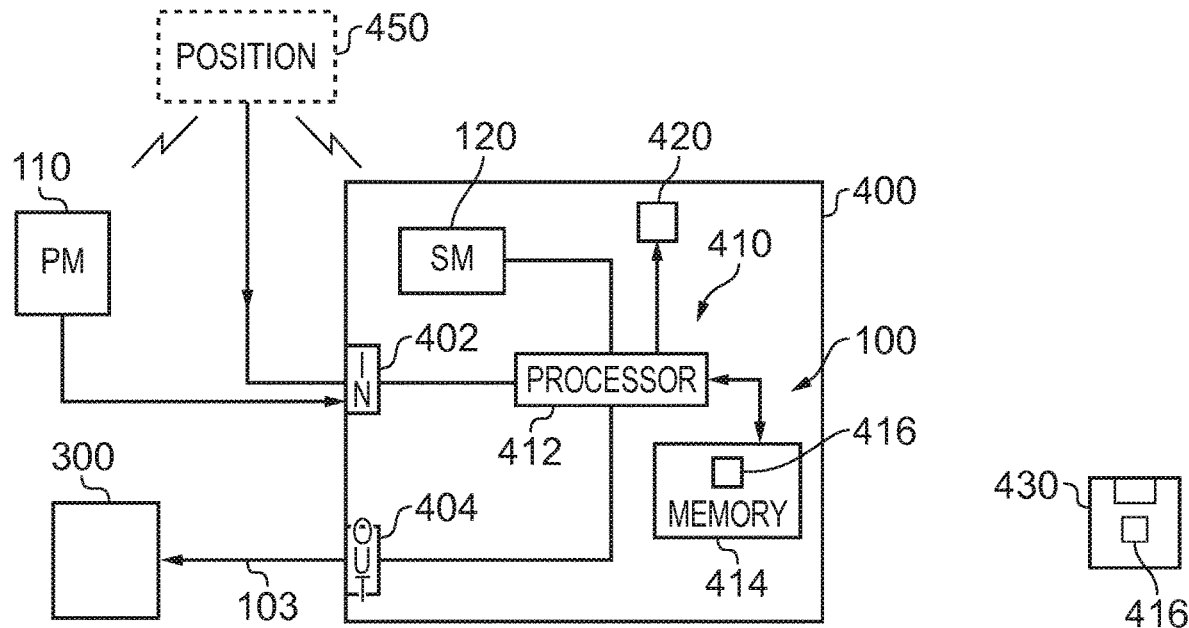
FIG. 7 illustrates an example of the system implemented using an apparatus.

FIG. 7 illustrates an example of the system 100 implemented using an apparatus 400. The electronic device 400 may, for example, be a static electronic device, a portable electronic device or a hand-portable electronic device that has a size that makes it suitable to carried on a palm of a user or in an inside jacket pocket of the user.

In this example, the apparatus 400 comprises the static microphone 120 as an integrated microphone but does not comprise the one or more portable microphones 110 which are remote. In this example, but not necessarily all examples, the static microphone 120 is a microphone array. However, in other examples, the apparatus 400 does not comprise the static microphone 120.

The apparatus 400 comprises an external communication interface 402 for communicating externally with external microphones, for example, the remote portable microphone(s) 110. This may, for example, comprise a radio transceiver.

A positioning system 450 is illustrated. This positioning system 450 is used to position the portable microphone(s) 110 relative to the origin of the sound scene e.g. the static microphone 120. In this example, the positioning system 450 is illustrated as external to both the portable microphone 110 and the apparatus 400. It provides information dependent on the position z of the portable microphone 110 relative to the origin of the sound scene to the apparatus 400. In this example, the information is provided via the external communication interface 402, however, in other examples a different interface may be used. Also, in other examples, the positioning system may be wholly or partially located within the portable microphone 110 and/or within the apparatus 400.

The position system 450 provides an update of the position of the portable microphone 110 with a particular frequency and the term 'accurate' and 'inaccurate' positioning of the sound object should be understood to mean accurate or inaccurate within the constraints imposed by the frequency of the positional update. That is accurate and inaccurate are relative terms rather than absolute terms.

The apparatus 400 wholly or partially operates the system 100 and method 200 described above to produce a multi-microphone multichannel audio signal 103.

The apparatus 400 provides the multi-microphone multi-channel audio signal 103 via an output communications interface 404 to an audio output device 300 for rendering.

In some but not necessarily all examples, the audio output device 300 may use binaural coding. Alternatively or additionally, in some but not necessarily all examples, the audio output device 300 may be a head-mounted audio output device.

In this example, the apparatus 400 comprises a controller 410 configured to process the signals provided by the static microphone 120 and the portable microphone 110 and the positioning system 450. In some examples, the controller 410 may be required to perform analogue to digital conversion of signals received from microphones 110, 120 and/or perform digital to analogue conversion of signals to the audio output device 300 depending upon the functionality at the microphones 110, 120 and audio output device 300. However, for clarity of presentation no converters are illustrated in FIG. 7.

Implementation of a controller 410 may be as controller circuitry. The controller 410 may be implemented in hardware alone, have certain aspects in software including firmware alone or can be a combination of hardware and software (including firmware).

As illustrated in FIG. 7 the controller 410 may be implemented using instructions that enable hardware functionality, for example, by using executable instructions of a computer program 416 in a general-purpose or special-purpose processor 412 that may be stored on a computer readable storage medium (disk, memory etc) to be executed by such a processor 412.

The processor 412 is configured to read from and write to the memory 414. The processor 412 may also comprise an output interface via which data and/or commands are output by the processor 412 and an input interface via which data and/or commands are input to the processor 412.

The memory 414 stores a computer program 416 comprising computer program instructions (computer program code) that controls the operation of the apparatus 400 when loaded into the processor 412. The computer program instructions, of the computer program 416, provide the logic and routines that enables the apparatus to perform the methods illustrated in FIGS. 1-10. The processor 412 by reading the memory 414 is able to load and execute the computer program 416.

As illustrated in FIG. 7, the computer program 416 may arrive at the apparatus 400 via any suitable delivery mechanism 430. The delivery mechanism 430 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 416. The delivery mechanism may be a signal configured to reliably transfer the computer program 416. The apparatus 400 may propagate or transmit the computer program 416 as a computer data signal.

Although the memory 414 is illustrated as a single component/circuitry it may be implemented as one or more separate components/circuitry some or all of which may be integrated/removable and/or may provide permanent/semi-permanent/dynamic/cached storage.

Although the processor 412 is illustrated as a single component/circuitry it may be implemented as one or more separate components/circuitry some or all of which may be integrated/removable. The processor 412 may be a single core or multi-core processor.

Figure 8:
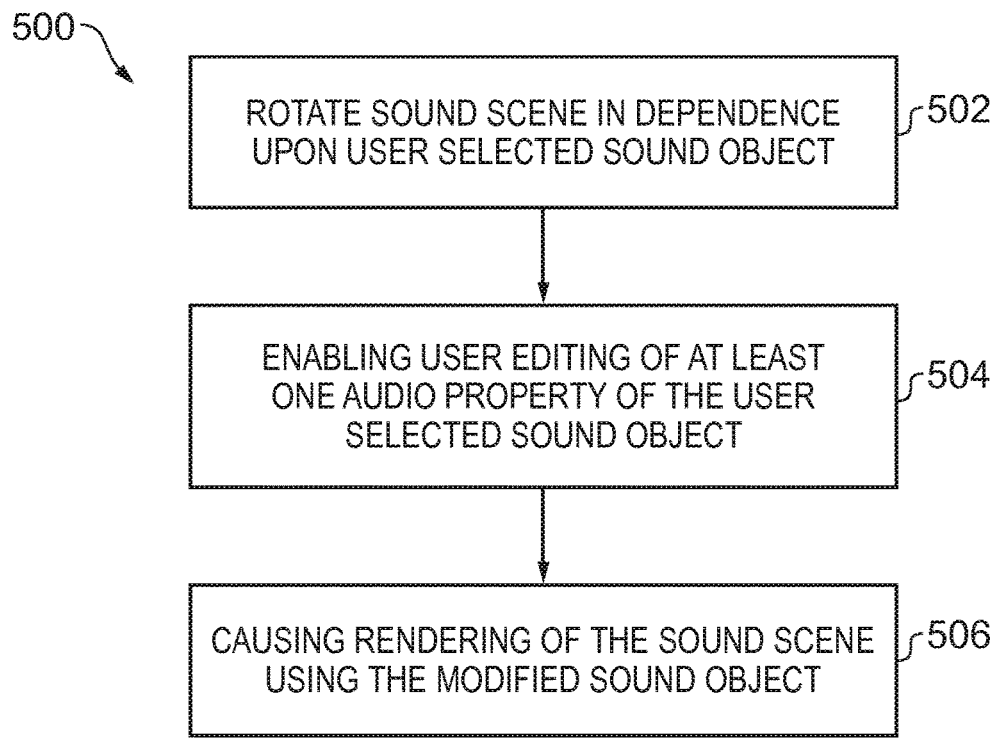
FIG. 8 illustrates an example of a method for enabling user editing of at least one audio property of a user selected sound object in a sound scene.
Figure 9A:
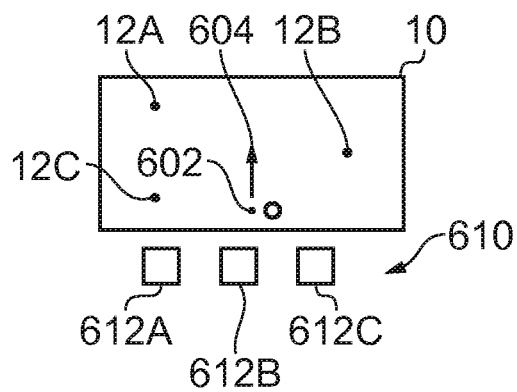
FIG. 9A, 9B, 9C, 9D illustrates sound scene 10 comprising multiple different sound objects none, one, or more than one of the sound objects selected.

FIG. 8 illustrates an example of a method 500 for enabling user editing of at least one audio property of a user selected sound object 12 in a sound scene 10. FIG. 9A illustrates one example of a sound scene 10 comprising multiple different sound objects 12A, 12B, 12C.

Referring back to FIG. 8, the method 500 comprises, at block 502, processing audio signals (e.g. audio signals 112, 187) to rotate a sound scene 10 so that a user selected sound object 12 is automatically at a first position within the rotated sound scene 10. Then, at block 504, the method 500 comprises enabling user editing of at least one audio property of the user selected sound object 12 to create a modified sound object 12. Then the method 500 continues at block 506 by causing rendering of the sound scene 10 using the modified sound object 12. The sound object 12, within the sound scene 10, may, for example, be a recorded sound object which represents sounds recorded at a particular microphone, for example, a portable microphone 110 such as, for example, a Lavalier microphone or other up-close microphone.

In this example, the audio signals 112 output from the portable microphone 110 represent a sound object 12 as previously described. As previously described in relation to FIG. 3, the audio signals 112 from the portable microphone 110 may be processed by a module 170 to produce a modified multichannel audio signal 142 before it is mixed with the multichannel audio signal 132 to form the multi-microphone multichannel audio signal 103. The orientation block 150 is configured to rotate the multichannel audio signal 142 to create a modified sound object 12 represented by the modified multichannel audio signals 142 output from the orientation block 150.

The at least one audio property of the selected sound object 12 that is edited by the user to create the modified sound object represented by the modified multichannel audio signals 142 may, for example, be an amplitude (volume) of the user selected sound object 12. Referring back to FIG. 5, this may be achieved by, for example, increasing or decreasing the gain provided by the variable gain devices 181, 191 in the respective direct path and indirect path(s) of the module 170. This change in amplitude may, for example, correspond to a change in distance of the user selected sound object 12 from an origin of the rendered sound scene. In another example, the at least one audio property of the selected sound object 12 may be the gain of the gain device 181 in the direct path of the module 170. Modifying this gain will modify the gain of the direct path relative to the indirect path. In another example, the at least one audio property of the selected sound object 12 may be the gain of the gain device 191 in the indirect path of the module 170. Modifying this gain changes the gain of the indirect path relative to the direct path. It will therefore be appreciated that it is possible to modify one or more audio properties of the selected sound object 12 simultaneously.

In some, but not necessarily all examples, the system 100 may be configured to enable a user to program, via user actions detected by the system 100, which audio properties of the selected sound object 12 are changeable and how they are changeable.

In some, but not necessarily all examples, the method 500 performs block 502 automatically in response to user selection of the sound object 12 for editing. In this way, processing the audio signals 112 to rotate the sound scene 10 so that a user selected sound object 12 is automatically at a first position within the rotated sound scene 10, occurs automatically in response to user selection of the sound object 12 for editing.

FIG. 9A illustrates an example of a recorded sound scene 10 comprising multiple sound objects 12 at different positions within the sound scene. Each sound object 12 has a position z(t) from an origin of the recorded sound scene 10. It is possible for the positions of the multiple sound objects 12 in a rendered sound scene 10 to be different to those in a recorded sound scene 10 and it is possible for the origin of the rendered sound scene 10 at which a notional listener is positioned to be different from the origin of the recorded sound scene 10. However, in the remainder of this description it will be assumed, for the examples described, that the rendered sound scene 10 and the recorded sound scene 10 have the same sound objects 12 at the same positions except where a user edits an audio property of a selected sound object 12 to change its position within the rendered sound scene 10. It will also be assumed that the origin of the rendered sound scene 10 and origin of the recorded sound scene 10 are the same.

In the example of FIG. 9A, a notional listener at the origin O of the rendered sound scene 10 is at a location 602 and has an orientation 604 in a direction indicated by the arrow head.

Figure 9B:
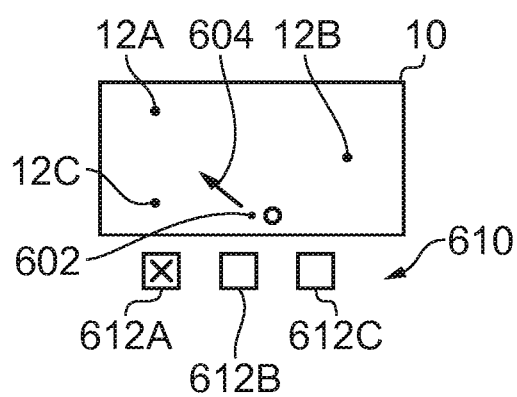

In the example of FIG. 9B, the orientation 604 of the notional listener at the origin O of the rendered sound scene 10 has changed so that it is pointing towards a user selected sound object, the first sound object 12A. The position 602 of the notional listener in the rendered sound scene 10 has not changed.

Figure 9C:
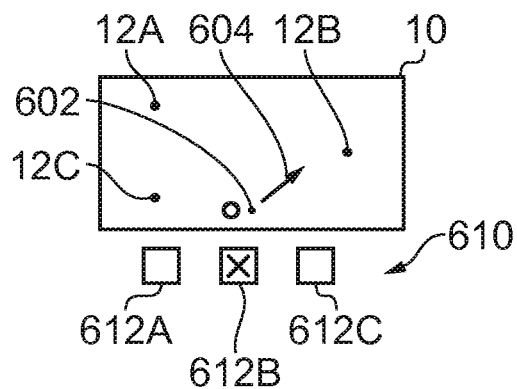

In the example of FIG. 9C, the orientation 604 of the notional listener at the origin O of the rendered sound scene 10 has changed so that it is pointing towards a different user selected sound object, the second sound object 12B. The position 602 of the notional listener in the rendered sound scene 10 has not changed.

The direction of the orientation 604 of the notional listener at the origin O of the rendered sound scene 10 is changed between FIGS. 9A and 9B and between FIGS. 9B and 9C. The relative orientation between the notional listener and the rendered sound scene 10 is changed by changing the angle θ in FIGS. 4A and 4B as previously described.

FIGS. 9A, 9B and 9C also illustrate a user input 610 comprising multiple user input devices 612. A user is able to select a particular sound object 12 using the user input 610. For example, each of the multiple user input devices 612 may, for example, be associated with a particular sound object 12. The selection of a particular one of the user input devices 612 by the user selects the sound object 12 associated with that user input device 612. The selection of a particular one of the multiple user input devices 612 may, for example, occur by a user touching a user input device 612.

In the example of FIG. 9A, none of the multiple user input devices 612 has been selected.

In the example of FIG. 9B, a first user input device 612A has been selected. The selection of the first user input device 612A results in user selection of a first sound object 12A within the sound scene 10. In accordance with the method 500, audio signals representing the sound scene 10 are processed to rotate the sound scene 10 so that the first user selected sound object 12A is automatically at a position within the sound scene 10 aligned with the direction of the notional listener of the rendered sound scene 10. The direction 604 of the orientation of the notional listener is pointed automatically towards the first user selected sound object 12A. The user is now able to edit the first sound object 12A, while it is rendered, to edit at least one audio property of the selected sound object to create a modified sound object 12A. The sound scene 10 is then rendered using the modified first sound object 12A.

In the example of FIG. 9C, a second user input device 612B has been selected. The selection of the second user input device 612B results in user selection of a second sound object 12B within the sound scene 10. In accordance with the method 500, audio signals representing the sound scene 10 are processed to rotate the sound scene 10 so that the second user selected sound object 12B is automatically at a position within the sound scene 10 aligned with the direction of the notional listener of the rendered sound scene 10. The direction 604 of the orientation of the notional listener is pointed automatically towards the second user selected sound object 12B. The user is now able to edit the second sound object 12B, while it is rendered, to edit at least one audio property of the selected sound object to create a modified sound object 12B. The sound scene 10 is then rendered using the modified second sound object 12B.

It will therefore be appreciated that when the sound scene 10 comprises multiple sound objects 12, the method 500 of FIG. 8 may be performed in relation to each of the sound objects 12 separately.

Figure 9D:
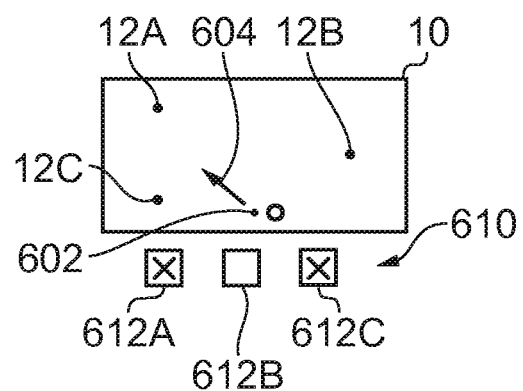

FIG. 9D illustrates an example in which more than one of the multiple input devices 612 is simultaneously selected. In this example, the simultaneously selected user input devices 612 form a group of user input devices that define a user selected group of sound objects 12. The group of user selected sound objects 12 consists of the sound objects 12 associated with each of the user input devices 612 in the selected group of user input devices. In this example, the orientation 604 of the notional listener of the rendered sound scene 10 is automatically directed to a location of the selected group of sound objects 12. The position may, for example, be an average position between the sound objects 12 in the user selected group. The average position may be, for example, determined by determining where the average relative displacement between each of the sound objects 12 in the user selected group of sound objects is zero or may be, for example, where a weighted relative displacement between the sound objects of the user selected group of sound objects is zero, where the relative displacements are, for example, weighted by the amplitude of the audio of the associated sound objects 12.

In FIG. 9D, a user has selected a group of sound objects 12 consisting of the first sound object 12A and the third sound object 12C. The orientation 604 of the notional listener of the rendered sound scene 10 is automatically directed to a location between the first sound object 12A and the third sound object 12C. The user is now able to edit the first sound object 12A and/or the third sound object 12B, while they are being rendered, to edit at least one audio property of the selected sound object(s) to create modified sound object(s). The sound scene 10 is then rendered using the modified second sound object(s).

It will be appreciated from the examples of FIGS. 9A, 9B, 9C and 9D, that when the method 500 is used in these examples to rotate a sound scene 10 so that a user selected sound object 12 is automatically at a first position within the sound scene 10, the rotation of the sound scene 10 occurs without any translation of the sound scene. That is there is only pure rotation of the sound scene. In the examples of FIGS. 9B and 9C, the user selected sound object 12A, 12B is located directly in front of the notional direction orientation of a listener in the rendered sound scene. That is the first position is front and central.

During a transition between different orientations of a notional listener of the sound scene, it is preferred that the rotation of the sound scene occurs slowly. For example, the rotation of the sound scene 10 may occur during rendering of the sound scene such that the sound scene 10 is rendered at a plurality of intermediate positions between an initial position occupied before rotation and the first position occupied after rotation.

Figure 10:
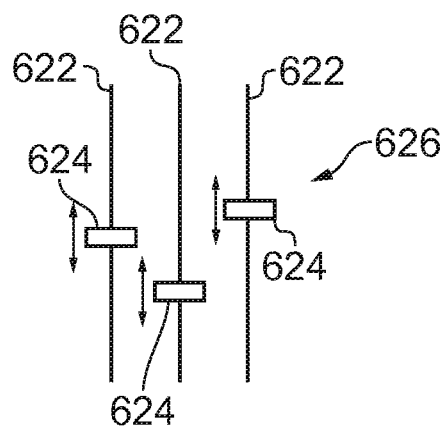
FIG. 10 illustrates an example of a user input device.

FIG. 10 illustrates an example of a user input device 612. In this example, the user input device 612 is a part of a mixing console 626. The user input device 612 comprises one or more sliders 624 that slide along tracks 622. It will be appreciated that this form of mixing console 626 is similar to a traditional mixing console used by a sound engineer. The physical sliders 624 may be touch sensitive so that it can be detected when a user touches (selects) a physical slider 624. In the example of FIG. 10, each of the physical sliders 624 is associated with the same sound object 12 and the selection of any one of the physical sliders 624 results in user selection of that sound object 12. This user selection may result in the automatic processing of audio signals to rotate the sound scene 10 so that the user selected sound object 12 is automatically at the first position within the sound scene 10.

In other examples each of the physical sliders 624 may be associated with a different sound object 12 and the touching of a particular one of the physical sliders 624 results in the automatic selection of a particular one of the sound objects 12 as a user selected sound object and the automatic rotation of the sound scene 10 so that that particular user selected sound object 12 is automatically at the first position within the sound scene 10, for example, front and central with respect to the user.

Referring back to the example of the apparatus 400 illustrated in FIG. 7, the apparatus 400 may be configured to comprise a display 420 or to control a display 420 that is external to the apparatus 400. A display 420 may be any suitable means for providing information in a form that is perceived visually by a user. The display 420 may, for example, be a visual display that displays using light at least part of a visual scene to a user. Examples of visual displays include liquid crystal displays, organic light emitting displays, emissive, reflective and transflective displays, direct retina projection displays, near eye displays etc.

The display 420 is configured to provide for mediated reality, augmented reality or virtual reality. "Mediated reality" refers to a user visually experiencing a fully or partially artificial environment (a virtual space) as a virtual scene at least partially displayed by a computer to a user. The virtual scene is determined by a point of view within the virtual space and field of view. Displaying the virtual scene means providing it in a form that can be seen by the user. The virtual space is a fully or partially artificial environment, which may be three-dimensional and a virtual scene is a representation of the virtual space viewed from a particular point of view within the virtual space.

Augmented reality refers to a form of mediated reality in which a user visually experiences a partial artificial environment (a virtual space) as a virtual scene comprising a real scene from a physical real world environment (real space) supplemented by one or more visual elements displayed by an apparatus to a user. The real scene may not necessarily be displayed in real time.

The term virtual reality refers to a form of mediated reality in which a user visually experiences a fully artificial environment (a virtual space) as a virtual scene displayed by display to a user.

Figure 11A:
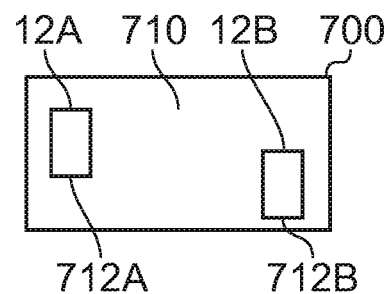
FIGS. 11A, 11B, 11C and 11D illustrate examples of displayed visual scenes corresponding to the sound scenes illustrated in FIGS. 9A, 9B, 9C, 9D.
Figure 11B:
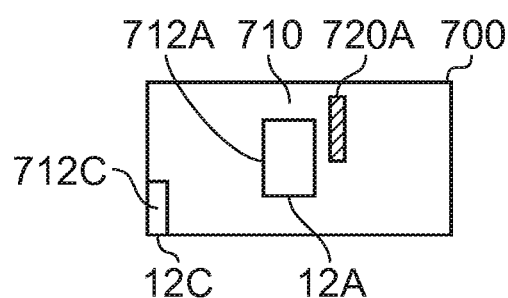
Figure 11C:
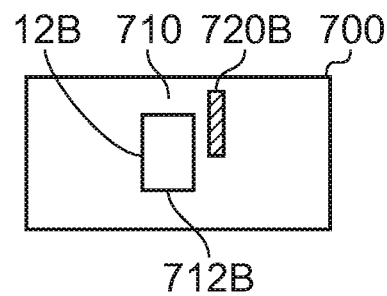
Figure 11D:
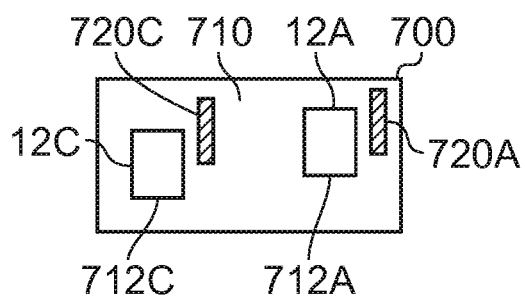

FIGS. 11A, 11B, 11C and 11D illustrate examples of displayed virtual scenes 710 which are displayed in the display 420. The displayed virtual scenes 710 may, for example, be an example of a virtual scene 710 used for mediated reality, augmented reality or virtual reality. In the examples of FIGS. 11A, 11C and 11D, the virtual scene 710 comprises additional augmenting information 720 that is additionally added to a visual scene 700 to provide for mediated reality, augmented reality or virtual reality. The additional augmenting information 720 may, for example, be virtual visual elements added to a recorded real visual scene 700 to provide for augmented reality.

The visual scene 700 illustrated in FIGS. 11B, 11C and 11D is determined by the point of view within the virtual space and a field of view. In the examples of FIGS. 11A, 11B, 11C and 11D, the point of view within the virtual space is aligned with the direction 604 of orientation of the notional listener in the rendered audio scene 10. This results in correspondence between the visual scene 700 illustrated in the display 420 and the sound scene 10 rendered. The position of each sound object 12 within the sound scene 10 is the same from the perspective of the listener as a position of a visual representation of 712 of the sound object 12 within the virtual scene 710. There is therefore coherence between a position of a sound object in the rendered sound scene 10 and the position of the same sound object 10 in the virtual scene 710, that is, they have the same position.

In the example of FIG. 11A, the visual scene 700 comprises a first portion 712A corresponding to the first sound object 12A and a second portion 712B corresponding to the second sound object 12B. The field of view whilst sufficient to include both of these sound objects 12A, 12B does not include the third sound object 12C. The first portion 712A is a visual representation of the first sound object 12A. The second portion 712B is a visual representation of the second sound object 12B Referring to FIG. 11B, the visual scene 700 illustrated in FIG. 11B corresponds to the sound scene 10 illustrated in FIG. 9B. The point of view within the visual scene 700 is directed towards a first portion 712A of the visual scene 700 that corresponds to the first sound object 12A but does not include the second portion 712B corresponding to the second sound object 12B. The first portion 712A is a visual representation of the first sound object 12A The system 100 augments the visual scene 700 by displaying additional information 720A in association with the first portion 712A of the visual scene 700 associated with the first sound object 12A. The additional information 720A provides information that enables a user to control at least one audio property of the selected sound object 12A. For example, it may indicate a value of an audio property of the selected sound object or values of audio properties of the selected sound object.

Referring to FIG. 11C, the visual scene 700 illustrated in FIG. 11C corresponds to the sound scene 10 illustrated in FIG. 9C. The point of view within the virtual space 700 is directed towards a second portion 712B of the visual scene 700 that corresponds to the second sound object 12B but does not include the first portion 712A corresponding to the first sound object 12A. The second portion 712B is a visual representation of the second sound object 12B.

The system 100 augments the visual scene 700 by displaying additional information 720B in association with the second portion 712B of the visual scene 700 associated with the second sound object 12B. The additional information 720B provides information that enables a user to control at least one audio property of the selected second sound object 12B. For example, it may indicate a value of an audio property of the selected sound object or values of audio properties of the selected sound object.

Referring to FIG. 11D, the visual scene 700 illustrated in FIG. 11D corresponds to the sound scene 10 illustrated in FIG. 9D. In FIG. 9D, a user has selected a group of sound objects 12 consisting of the first sound object 12A and the third sound object 12C. The orientation 604 of the notional listener of the rendered sound scene 10 is automatically directed to a location between the first sound object 12A and the third sound object 12C. The point of view within the visual scene 700 is directed in the same direction as orientation 604 towards a portion of the visual scene 700 that is centred between the first sound object 12A and the third sound object 12C and includes a first visual representation 712A of the first sound object 12A and a third visual representation 712C of the third sound object 12B. A the field of view of the visual scene 700 is adapted so that it is large enough to include visual representations 712 of all the sound objects 12 in the user selected group.

The system 100 augments the visual scene 700 by displaying additional information 720A in association with the first portion 712A of the visual scene 700 associated with the first sound object 12A. The additional information 720A provides information that enables a user to control at least one audio property of the selected first sound object 12A. For example, it may indicate a value of an audio property of the selected sound object or values of audio properties of the selected sound object.

The system 100 augments the visual scene 700 by displaying additional information 720C in association with the third portion 712C of the visual scene 700 associated with the third sound object 12C. The additional information 720C provides information that enables a user to control at least one audio property of the selected second sound object 12C. For example, it may indicate a value of an audio property of the selected sound object or values of audio properties of the selected sound object.

When the user has selected a particular sound object 12 (which may be a group of sound objects), the sound scene 10 is rotated automatically so that the selected sound object 12 is at a front position within the sound scene 10, and the visual scene 700 is also rotated automatically to display a visual representation 712 of the selected sound object 10 at the front position within the visual scene 700. The front position within the sound scene 10 and the front position within the visual scene 700 correspond to the same position for the user. The rotation of the sound scene 10 and the rotation of the visual scene 700 may be synchronized so that as the sound scene 10 rotates, the visual scene 700 rotates simultaneously at the same rate.

Figure 12:
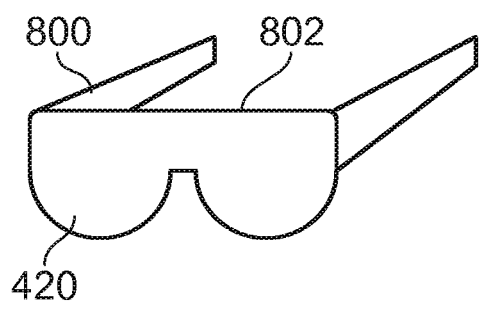
FIG. 12 illustrates an example of a head-mounted apparatus comprising an augmented reality display.

FIG. 12 illustrates an example of a head-mounted apparatus 800 comprising the display 420 that displays images to a user. The apparatus 800 may be moved automatically when the head of a user moves.

In some examples, the head-mounted apparatus 800 may also provide the functionality of the head-mounted audio output device 300.

The head-mounted apparatus 800 may, for example, be operated as a see-video arrangement for mediated reality that enables a visual scene 700 to be displayed by the display 420 for viewing by the user. In this case the visor 802 is opaque and may be used as display 420. The visual scene 700 may be an artificial scene (virtual reality) or a real scene (augmented reality).

In some examples, the placement of the head-mounted apparatus 800 onto the head of a user may cause the system 100 to perform or to be able to perform the method 500 illustrated in FIG. 8. That is, while the head-mounted apparatus 800 is not placed on a head of a user, the method 500 is not operational. When the head-mounted apparatus is placed on a head of a user, the method 500 becomes operational enabling automatic rotation of the sound scene 10 and the visual scene 700 when the user interacts with a user input device 612 to select a sound object 12. The sound scene 10 and the visual scene 700 may, for example, be automatically rotated so that the selected sound object in both of the sound scene 10 and in the visual scene 700 is front and central to the user. In addition, or as an alternative, the placement of the head-mounted apparatus 800 on a head of a user may control which of the audio properties of a sound object 12 selected by the user may be edited at block 504 of the method 500 in FIG. 8. For example, when a user is wearing the head-mounted apparatus 800, the user may be able to edit at block 504 of the method 500 a distance of a sound object in the sound scene 10.

The method 500 in FIG. 8 may, for example occur in some examples, when the user is wearing the head-mounted apparatus 800 and the user then selects a sound object 12 by, for example, touching a user input device 612. Alternatively, the method 500 of FIG. 8 may occur if a user is selecting a sound object 12, for example by touching a particular user input device 612, when they place the head-mounted apparatus onto their head. Thus the processing of the audio signals to rotate the sound scene so that the selected sound object is automatically in a first position within a sound scene, is automatic in response to user selection of the sound object for editing while in a mediated reality mode or entering a mediated reality mode while selecting a sound object for editing.

The foregoing description describes a system 100 and method 200 that can position a sound object within a rendered sound scene 10 and can rotate the rendered sound scene. The inventors have realized that the system 100 may also be used to change the rendered sound scene to assist with editing of the sound scene 10.

The method 500 may, for example, be performed by the system 100, for example, using the controller 410 of the apparatus 400.

It will be appreciated from the foregoing that the various methods 500 described may be performed by an apparatus 400, for example an electronic apparatus 400.

The electronic apparatus 400 may in some examples be a part of an audio output device 300 such as a head-mounted audio output device or a module for such an audio output device 300. The electronic apparatus 400 may in some examples additionally or alternatively be a part of a head-mounted apparatus 800 comprising the display 420 that displays images to a user.

It will be appreciated from the foregoing that the various methods 500 described may be performed by a computer program used by such an apparatus 400.

For example, an apparatus 400 may comprises:
at least one processor 412; and
at least one memory 414 including computer program code
the at least one memory 414 and the computer program code configured to, with the at least one processor 412, cause the apparatus 400 at least to perform: processing audio signals to rotate a sound scene so that a user selected sound object is automatically at a first position within the rotated sound scene; enabling user editing of audio properties of the selected sound object to create a modified sound object; and causing rendering of the sound scene using the modified sound object.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 1-12 may represent steps in a method and/or sections of code in the computer program 416. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one memory including computer program code,
the at least one memory and the computer program code configured to, with the at least one processor, cause the apparatus to perform at least the following:
enable user selection of one of multiple different sound sources to define a user selected sound source by detecting which one of multiple input devices, each of which is associated with a particular sound source, is touched by a user;
rotate a sound scene so that the user selected sound source is automatically at a first position within the rotated sound scene;
enable user editing of at least one audio property of the selected sound source to create a modified sound source;
cause rendering of the sound scene using the modified sound source; and
enable display in a display of a visual scene associated with the sound scene comprising information for enabling user control of at least one audio property of the selected sound source to create the modified sound source, the information being displayed, using mediated reality, in association with that part of the visual scene associated with the selected sound source,
wherein sound sources are associated with at least one of an object within the visual scene and a recording device within the visual scene.

2. An apparatus as claimed in claim 1, wherein the multiple input devices are physical sliders of a mixing console.

3. An apparatus as claimed in claim 2, wherein the display used to display the visual scene is comprised in a head-mounted display device configured for mediated reality.

4. An apparatus as claimed in claim 1, wherein the selected sound source is a recorded sound source associated with a portable microphone.

5. An apparatus as claimed in claim 1, wherein rotating the sound scene so that a user selected sound object is automatically at a first position within the rotated sound scene comprises rotation of the sound scene without translation of the sound scene.

6. An apparatus as claimed in claim 1, wherein the first position of the selected sound source within the rotated sound scene is that the user selected sound source is directly front and central relative to the user listening to the rendered sound scene.

7. An apparatus as claimed in claim 1, wherein rotation of the sound scene occurs while the sound scene is being rendered, such that the user selected sound source is, during rotation rendered at a plurality of positions between an initial position before rotation and the first position after rotation.

8. An apparatus as claimed in claim 1, further cause the apparatus to perform at least the following:
enable display in a display of a visual scene corresponding to the sound scene.

9. An apparatus as claimed in claim 8, further cause the apparatus to perform at least the following:
rotate the visual scene so that a portion of the visual scene displayed in the display comprises the user selected sound source.

10. An apparatus as claimed in claim 9, further cause the apparatus to perform at least the following:
synchronize rotation of the visual scene and the sound scene so that the position of the sound source in the sound scene relative to a user corresponds to a position of the user selected sound source in the visual scene relative to the user.

11. An apparatus as claimed in claim 8, further cause the apparatus to perform at least the following:
augment the visual scene by displaying information not present in a recorded scene, in association with the user selected sound source, wherein the displayed information enables user control of at least one audio property of the selected sound source to create a modified sound source.

12. An apparatus as claimed in claim 1, wherein the at least one audio property of the selected sound source edited by the user is determined by user action.

13. An apparatus as claimed in claim 1, wherein the processing of audio signals to rotate the sound scene so that the user selected sound source is automatically at the first position within the sound scene is automatic in response to user selection of the sound source for editing.

14. An apparatus as claimed in the claim 1, where in the apparatus is a module for an audio device.

15. An apparatus as claimed in the claim 1, where in the apparatus is a head-mounted audio device.

16. A method comprising:
enabling user selection of one of multiple different sound sources to define a user selected sound source by detecting which one of multiple input devices, each of which is associated with a particular sound source, is touched by a user;
rotating a sound scene so that the user selected sound source is automatically at a first position within the rotated sound scene;
enabling user editing of at least one audio property of the selected sound source to create a modified sound source;
causing rendering of the sound scene using the modified sound source; and
enabling display in a display of a visual scene associated with the sound scene comprising information for enabling user control of at least one audio property of the selected sound source to create the modified sound source, the information being displayed, using mediated reality, in association with that part of the visual scene associated with the selected sound source,
wherein sound sources are associated with at least one of an object within the visual scene and a recording device within the visual scene.

17. A method as claimed in claim 16, wherein the selected sound object is a recorded sound object associated with a portable microphone.

18. A method as claimed in claim 16, wherein processing the audio signals to rotate the sound scene so that a user selected sound object is automatically at a first position within the rotated sound scene comprises rotation of the sound scene without translation of the sound scene.

19. A method as claimed in claim 16, wherein the first position of the selected sound source within the rotated sound scene is that the user selected sound source is directly front and central relative to the user listening to the rendered sound scene.

20. A non-transitory computer readable medium comprising program instructions stored thereon for performing at least the following:
enable user selection of one of multiple different sound sources to define a user selected sound source by detecting which one of multiple input devices, each of which is associated with a particular sound source, is touched by a user;
rotate a sound scene so that the user selected sound source is automatically at a first position within the rotated sound scene;
enable user editing of at least one audio property of the selected sound source to create a modified sound source;
cause rendering of the sound scene using the modified sound source; and
enable display in a display of a visual scene associated with the sound scene comprising information for enabling user control of at least one audio property of the selected sound source to create the modified sound source, the information being displayed, using mediated reality, in association with that part of the visual scene associated with the selected sound source,
wherein sound sources are associated with at least one of an object within the visual scene and a recording device within the visual scene.

* * * * *